United States Patent [19]

Kleptz

[11] 4,386,303

[45] May 31, 1983

[54] D.C. MOTOR SYSTEM FOR A GATLING GUN

[75] Inventor: James A. Kleptz, Shelburne, Vt.

[73] Assignee: General Electric Company, Burlington, Vt.

[21] Appl. No.: 213,243

[22] Filed: Dec. 4, 1980

[51] Int. Cl.³ .............................................. H02P 5/06
[52] U.S. Cl. .................................... 318/327; 318/317; 318/297; 318/258
[58] Field of Search ............... 318/312, 315, 317, 326, 318/327, 338, 342, 350, 381, 296, 297, 299, 257, 318/258

[56] References Cited

U.S. PATENT DOCUMENTS

| | | | |
|---|---|---|---|
| 502,185 | 7/1893 | Gatling . | |
| 2,849,921 | 9/1958 | Otto | 89/12 |
| 3,213,343 | 10/1965 | Sheheen | 318/341 |
| 3,349,309 | 10/1967 | Dannettell | 318/341 |
| 3,519,907 | 7/1970 | White et al. | 318/122 |
| 3,611,871 | 10/1971 | Kirkpatrick et al. | 89/127 |
| 3,694,715 | 9/1972 | Van Der Linde et al. | 318/139 |
| 4,004,490 | 1/1977 | Dix et al. | 89/33 |
| 4,046,056 | 9/1977 | Carrie | 89/12 |

Primary Examiner—J. V. Truhe
Assistant Examiner—Richard M. Moose
Attorney, Agent, or Firm—Bailin L. Kuch

[57] ABSTRACT

A feature of this invention is the provision of a reversible, D.C. shunt field motor having an armature and two separate field windings, each field winding being capable of producing rated field flux. The motor is capable of bidirectional rotation having one field energizable for CW rotation and the other field energizable for CCW rotation. A servo system couples the two field windings and has only one active control element in the high current armature circuit to control the magnitude of the armature current, and two low power amplifiers, each low power amplifier having an active control element and each controlling the magnitude of the field flux (and thereby the magnitude of armature current under certain circumstances) in a given respective direction.

8 Claims, 7 Drawing Figures

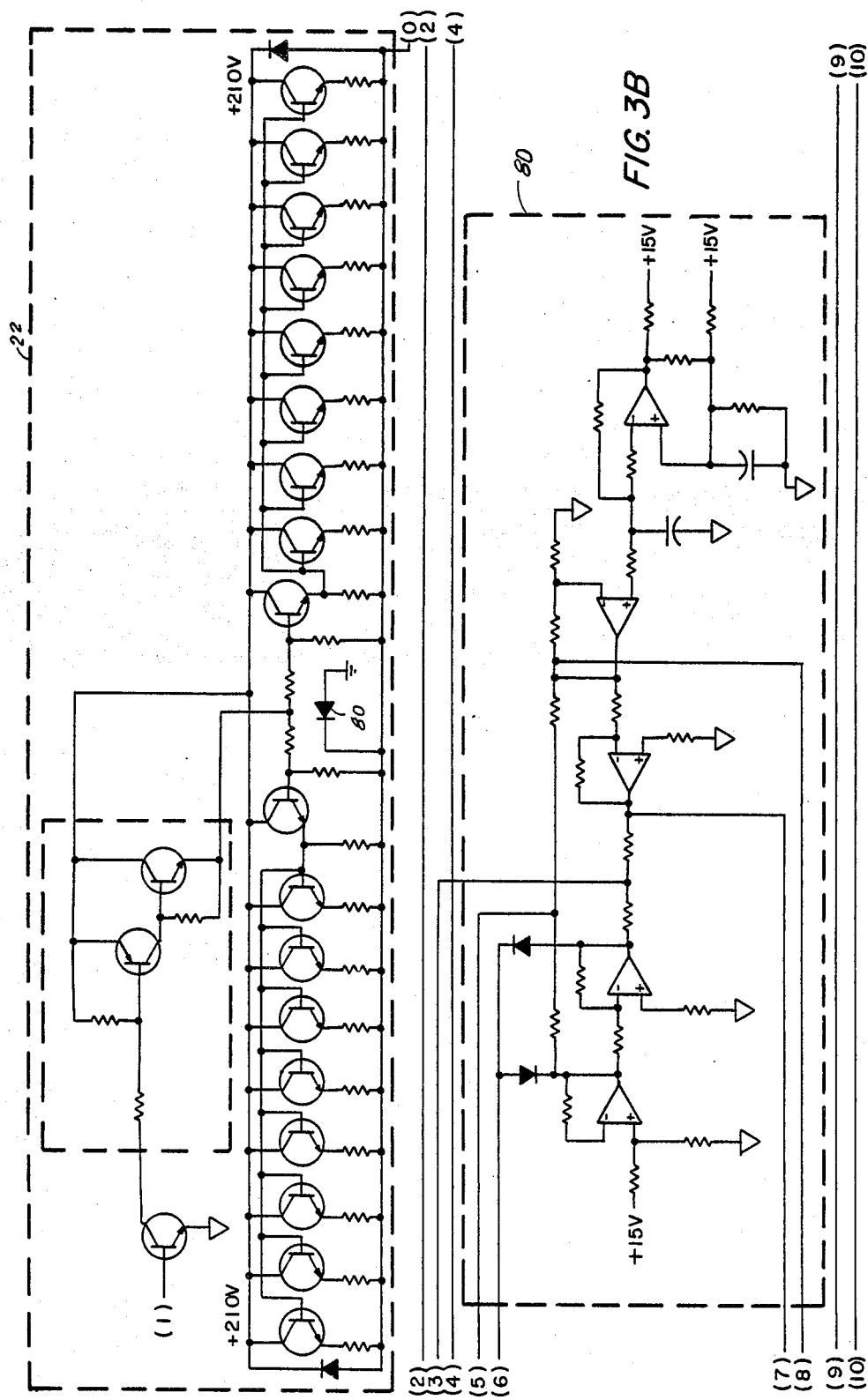

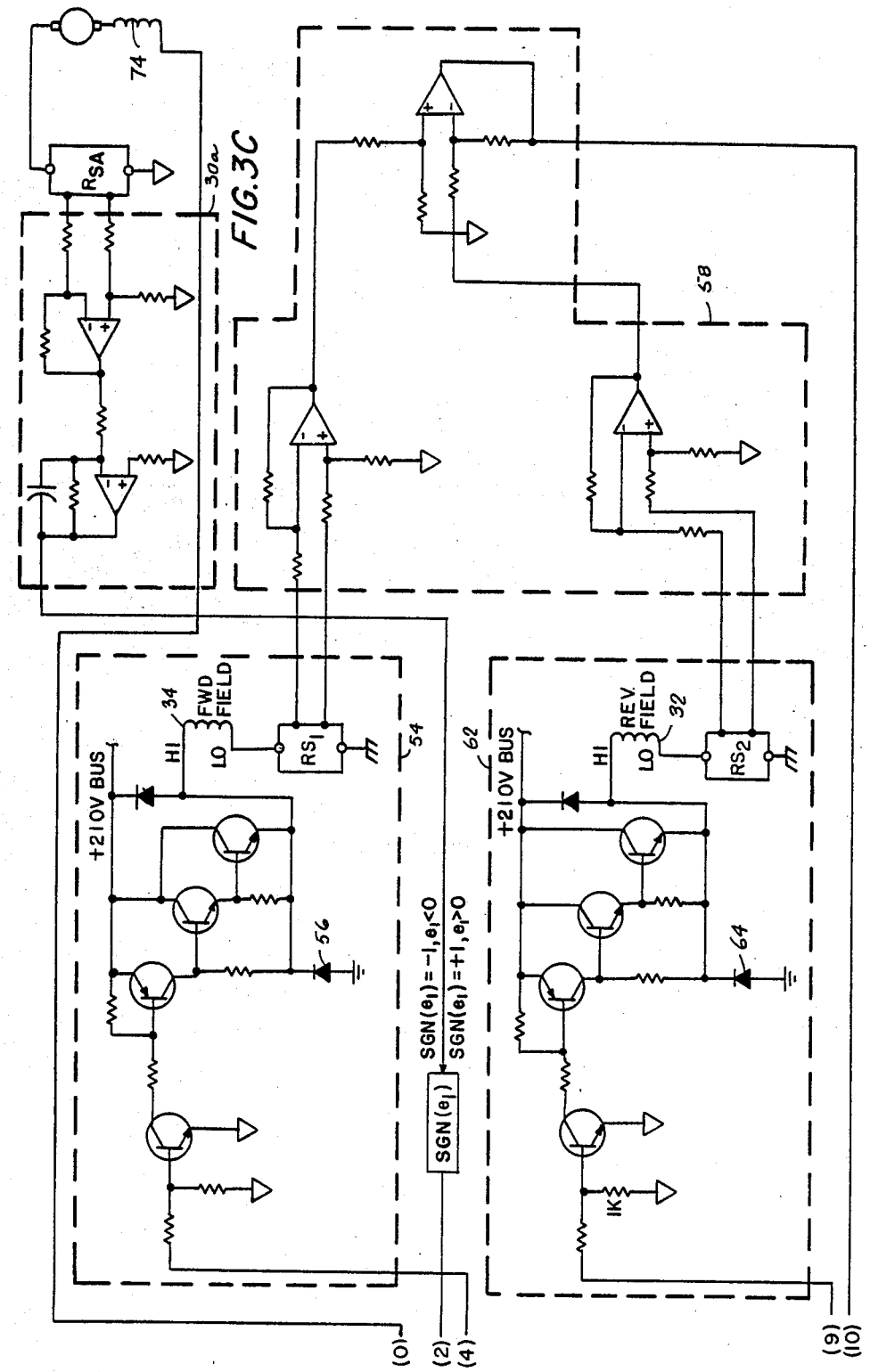

D.C. MOTOR SYSTEM FOR A GATLING GUN

BACKGROUND OF THE INVENTION

1. Field of the Invention

This invention relates to an electrical drive system for rotating the cluster of barrels in a Gatling type gun.

2. Prior Art

An electrical drive system for rotating the cluster of barrels was shown by R. J. Gatling in U.S. Pat. No. 502,185 issued July 25, 1893 as an alternative to the then conventional handcrank. The early modern Gatling type gun was similarly driven by an electric motor, as shown by H. M. Otto in U.S. Pat. No. 2,849,921 issued Sept. 2, 1958. In these and subsequent Gatling type guns, after a burst had been fired the motor was de-engaged and the barrel cluster was permitted to coast to a halt while the feeder was declutched and any already fed rounds of ammunition were passed through and out of the gun without being fired. In the GAU-8/A gun, which is driven by a hydraulic motor, after the burst is fired, the direction of rotation of the barrel cluster is reversed and any rounds already in the gun are fed back through the feeder into the ammunition handling system. A pneumatic system, subsequent to the GAU-8/A gun, which can accomplish such reverse clearing is shown in U.S. Pat. No. 4,046,056 issued Sept. 6, 1977 to G. W. Carrie.

There are many electric motor systems which are used for direction and speed controlled drive. Exemplary systems are shown in U.S. Pat. No. 3,213,343 issued to S. J. Sheheen on Oct. 19, 1965; U.S. Pat. No. 3,349,309 issued to A. C. Dannettell on Oct. 24, 1967; U.S. Pat. No. 3,694,715 issued to J. R. Van Der Linde et al on Sept. 26, 1972; and U.S. Pat. No. 3,519,907 issued to A. P. White et al on July 7, 1970.

SUMMARY OF THE INVENTION

Objects of this invention are to provide an electrical DC motor drive system for a Gatling type gun which will:

1. Accelerate the barrel cluster and feeder to a high percentage of the firing rate in a minimum of elapsed time;
2. Fire a predetermined number of shots in the first elapsed second as the barrel cluster and feeder accelerate to and reach the full firing rate;
3. Maintain the full firing rate until removal of the trigger signal;
4. Apply full reversed motor torque until a reverse predetermined clearing speed is obtained; and then
5. Dynamically brake the barrel cluster and feeder to a full stop.

A feature of this invention is the provision of a reversible, D.C. shunt field motor having an armature and two separate field windings, each field winding being capable of producing rated field flux. The motor is capable of bidirectional rotation having one field energizable for CW rotation and the other field energizable for CCW rotation. A servo system couples the two field windings and has only one active control element in the high current armature circuit to control the magnitude of the armature current, and two low power amplifiers, each low power amplifier having an active control element and each controlling the magnitude of the field flux (and thereby the magnitude of the armature current under certain circumstances) in a given respective direction.

BRIEF DESCRIPTION OF THE DRAWING

These and other objects, features and advantages of the invention will be apparent from the following specification thereof taken in conjunction with the accompanying drawing in which:

FIGS. 3A, 3B and 3C, taken in conjunction, are a simplified circuit drawing of the system of FIG. 1 and FIG. 5;

DESCRIPTION OF THE INVENTION

Figure 1:
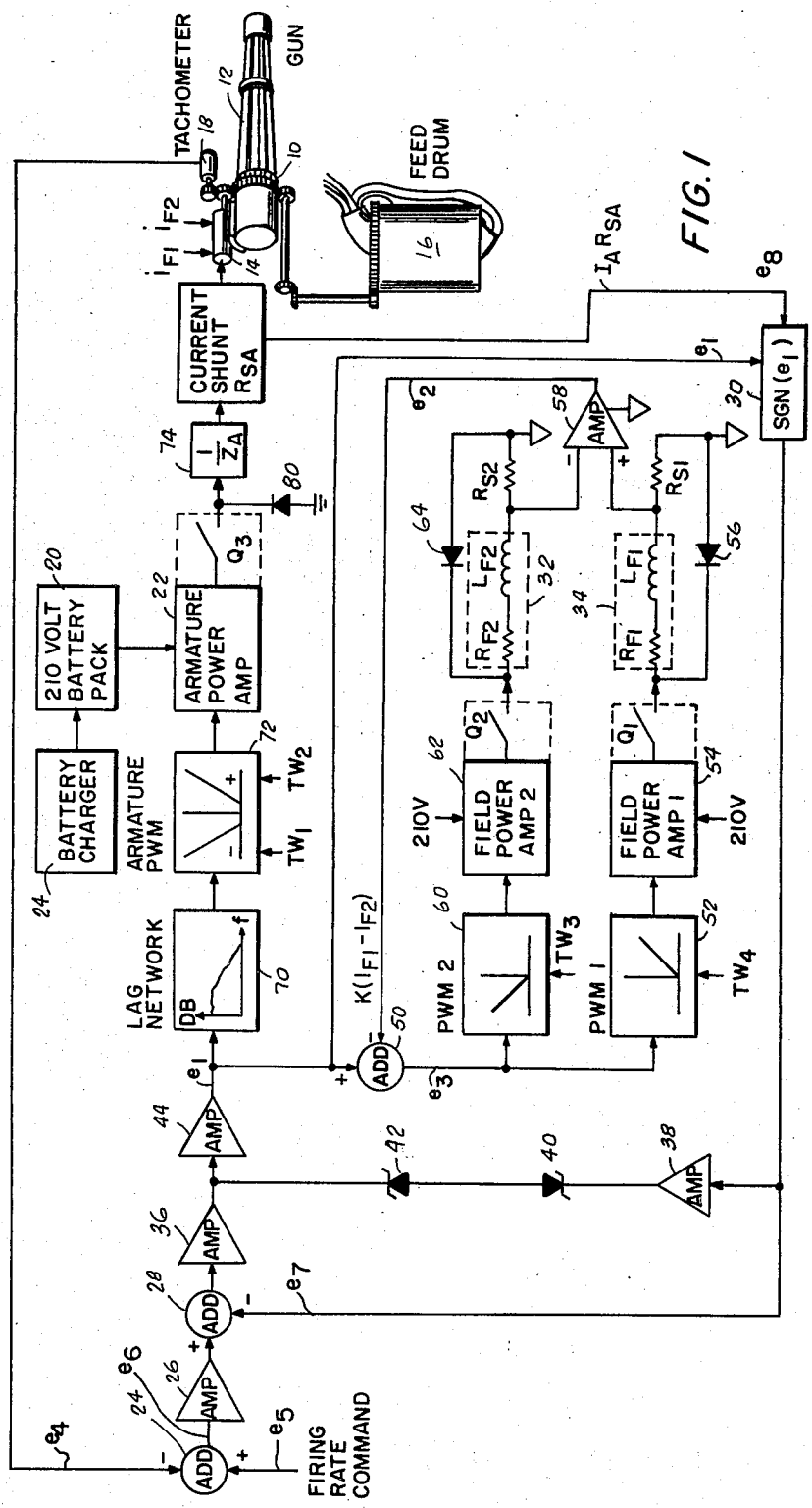
FIG. 1 is a block drawing of a motor system embodying this invention.

A Gatling type gun has a rotor 10 with a cluster of gun barrels 12. The rotor is driven by a motor 14, and drives an ammunition feed drum 16. The motor also drives a tachometer 18. The gun may be of the type shown by R. G. Kirkpatrick et al in U.S. Pat. No. 3,611,871 issued Oct. 12, 1971, and the drum may be of the type shown by J. Dix et al in U.S. Pat. No. 4,004,490 issued Jan. 25, 1977.

A 210 volt battery pack 20 provides DC power to an armature power amplifier 22. The battery pack may be energized by a suitable source, such as a battery charger 24.

A first voltage $e_5$ which is a function of the firing rate command is coupled to a first input terminal of an adder 24. A second voltage $e_4$ which is a function of the rotational velocity of the gun is provided by the tachometer 18 to a second input terminal of the adder 24. The polarity of the second voltage is such as to form the algebraic difference of the first and second voltages at the output terminal of the adder. The output voltage $e_6$ of the adder 24 is amplified by an amplifier 26, whose output voltage is coupled as a first input voltage to a first input terminal of an adder 28. This first input voltage, which is a function of the difference between the desired firing rate of the gun, i.e., the gun's rotational velocity, and the actual firing rate of the gun, is used to command a motor current in such a way as to reduce the difference between the desired and actual rates.

A second input voltage $e_7$ which is a function of the armature current of motor 14 is provided by the output terminal of the SGN ($e_1$) circuit 30 and is coupled to a second input terminal of the adder 28. The polarity of this second voltage is formed by the SGN ($e_1$) circuit 30 in such a way as to reduce the amplitude of the output voltage of the adder 28. The SGN ($e_1$) circuit serves to allow the application of negative feedback around the stages that follow the adder 28 for either positive or negative polarity of the output voltage of the amplifier 26. This permits the armature current of the motor 14 to be of only one polarity. An increase in amplitude of either polarity in the voltage output of the adder 28 results in an increase in armature current of one polarity only. As will be discussed later, the polarity and magnitude of the output of the adder 28 also determines which motor field winding, 32 or 34, will be excited, and the magnitude of that excitation.

The output of the adder 28 is coupled to the input of an amplifier 36, which has a gain of +1 and which serves as a buffer for the adder 28.

An amplifier 38, which has a gain of −1, has its input terminal coupled to the output terminal of the SGN ($e_1$) circuit and its output terminal coupled, via two back-to-back zener diodes 40 and 42, to the input terminal of an amplifier 44. The output terminal of the amplifier 36 is also coupled to the input terminal of the amplifier 44. The output voltage of the amplifier 38 is directly proportional to the magnitude of the motor armature current. The polarity of this output voltage of the amplifier 38 is forced by the SGN ($e_1$) circuit 30 to be opposite to the polarity of the output voltage of the amplifier 36. When the output voltage of the amplifier 38 reaches the breakdown voltage of either diode 40 or 42, depending on the polarity of the output voltage of amplifier 38, further increase in the output voltage of the amplifier 36 is prevented, thereby preventing any further increase in the magnitude of the motor armature current. Thus the breakdown voltage of the diodes 40 and 42 determines the maximum magnitude of the motor armature current.

The amplifier 44 serves as a buffer and provides a gain to circuitously force the output voltage of the amplifier 36 to small values. The output voltage of the amplifier 44 is identified as voltage $e_1$ and is coupled to a first input terminal of the SGN ($e_1$) circuit 30. The polarity of voltage $e_1$ determines the polarity of the output voltage of the SGN ($e_1$) circuit 30.

The voltage $e_1$ also serves as the excitation to the motor field amplifier, which is pulse within modulated and includes an adder 50 having two input terminals, one of which receives the voltage $e_1$ and the other of which receives a feedback voltage $e_2$. The output voltage $e_3$ of the adder 50 is coupled to a forward and a reverse field winding circuit. The forward field winding circuit includes a forward pulse width modulator 52 whose output is fed to a forward field power amplifier 54, which may be taken to include an effective switch $Q_1$, whose output is fed to the forward field winding 34 including resistance $R_{F1}$ and inductance $L_{F1}$ and through a resistor or shunt $R_{S1}$ to a ground return. A diode 56 reverse shunts the field winding and the resistor. The voltage developed across the resistor $R_{S1}$ is fed to a first input of an amplifier 58. The reverse field winding circuit includes a reverse pulse which modulator 60 whose output is fed to a reverse field power amplifier 62, which may be taken to include an effective switch $Q_2$, whose output is fed to the reverse field winding 32 including resistance $R_{F2}$ and inductance $L_{F2}$ and through a resistor $R_{S2}$ to a ground return. A diode 64 reverse shunts the field winding and the resistor. The voltage developed across the resistor $R_{S2}$ is fed to a second input of the amplifier 58. The polarity of the output voltage $e_3$ of the adder 50 determines which field winding circuit is excited and, thereby, the direction of the output torque of the motor 14. The voltages developed across the resistances $R_{S1}$ and $R_{S2}$ are a function of the respective field currents, $i_{F1}$ and $i_{F2}$ and the output voltage of the amplifier 58 is proportional to the difference between these field currents, i.e., $K(i_{F1}-i_{F2})$, which is identified as $e_2$. The voltage $e_2$ is thus a function of the magnitude and polarity of the motor field flux and is coupled to the second input terminal of the adder 50. The output voltage $e_3$ of the adder 50, which is $K(e_1-e_2)$, determines the polarity and magnitude of the motor field flux.

The voltage $e_1$ yet also serves as the excitation to the motor armature amplifier, which is pulse width modulated and includes a lag network 70 whose output voltage is fed to a pulse width modulator 72, which in turn drives the armature power amplifier 22 whose output drives the armature 74 of the motor 14 via an armature current shunt $R_{SA}$. The voltage $I_A R_{SA}$ developed across the shunt is the second input $e_8$ to the SGN ($e_1$) circuit 30. The lag network may be provided by a low pass filter having a terminal slope of, e.g., 6 DB per octave. The lag network is used to smooth and to stabilize the armature current loop. The pulse width modulator 72 is unidirectional and has sufficient deadband so that the voltage $e_1$ develops nearly full field flux in the appropriate field winding 32 or 34 prior to it driving current through the motor armature 74 via the armature power amplifier 22 and its effective switch $Q_3$.

Current can flow through the motor armature from either of two possible sources. The normal mode of armature current flow is from the battery pack 20 through the pulse width modulated effective switch $Q_3$. This occurs for magnitude of $e_1$ greater than the deadband built in the pulse width modulator 72. The alternative mode of current is through a diode 80 coupled between ground and the conductor to the armature. This mode is possible because the polarity of voltage $e_1$ can cause a reversal in the polarity of the field flux after the motor armature has developed rotational velocity in a particular direction. Such a field flux polarity reversal will result from a reduction in, or a reversal of the firing rate command voltage. The field flux reversal converts the motor into a generator which passes current through the diode 80, while the effective switch $Q_3$ is open. The inertial energy of the armature is converted to heat as the armature slows. No pumpback of current to the battery occurs as effective switch $Q_3$ is open.

A maximum limit on current is maintained at all times by the breakdown action of the zener diodes 40 and 42. Current is controlled either by the switching function of the effective switch $Q_3$ or by reversals of field flux driving current through the diode 80.

When the gun and the motor armature are at rest, a positive firing command voltage will result in a positive voltage $e_1$, which will be pulse width modulated at, for example, 1200 HZ by the forward pulse width modulator 52, which is only responsive to a positive input voltage. This modulator 52 turns on the forward field power amplifier 54, which is represented by the closure of $Q_1$, and current flow is established in the forward field winding 34. A relatively small current flow is established by mutual induction in the reverse field winding with a circulating path for this current provided by the shunt diode 64. The voltage across the current sensing resistors $R_{S1}$ and $R_{S2}$, which are respectively in series with the field windings, are then mutually subtracted to provide a feedback voltage $K(i_{F1}-i_{F2})$ to the adder 50 which is proportional to the difference of the field winding currents. A maximum field flux is established in the motor with, for example, a 20 ampere differential field current.

The voltage $e_1$ is also fed to the armature pulse width modulator 72 which provides a positive output voltage for either polarity of input, that is, an absolute value pulse width modulation. The armature power amplifier is thereby turned on, with its effective switch $Q_3$ closed, to cause a positive flow of current through the armature, which results in a positive torque, or forward direction rotational velocity, produced by the motor.

The motor accelerates the gun to its desired rotational velocity, e.g., 4200 shots per minute, which for a seven barrel gatling type gun is 600 revolutions per minute. The desired firing rate is maintained by the use of the tachometer feedback loop. The armature current sensing resistor $R_{S4}$, which is in series with the armature, is use to provide an armature current inner feedback loop to extend the bandwidth of the tachometer loop and also to provide a means to limit the armature current, for example, to 700 amperes.

Figure 2:
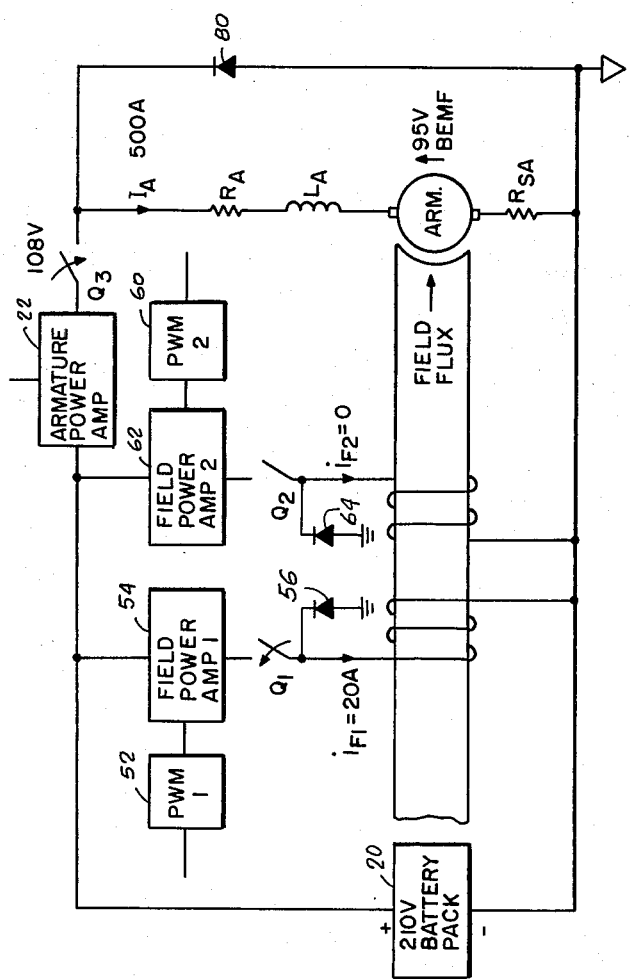
FIG. 2 is a simplified block drawing of the motor and power amplifier conditions when the rotor is being driven at its steady state rate.
Figure 3A:
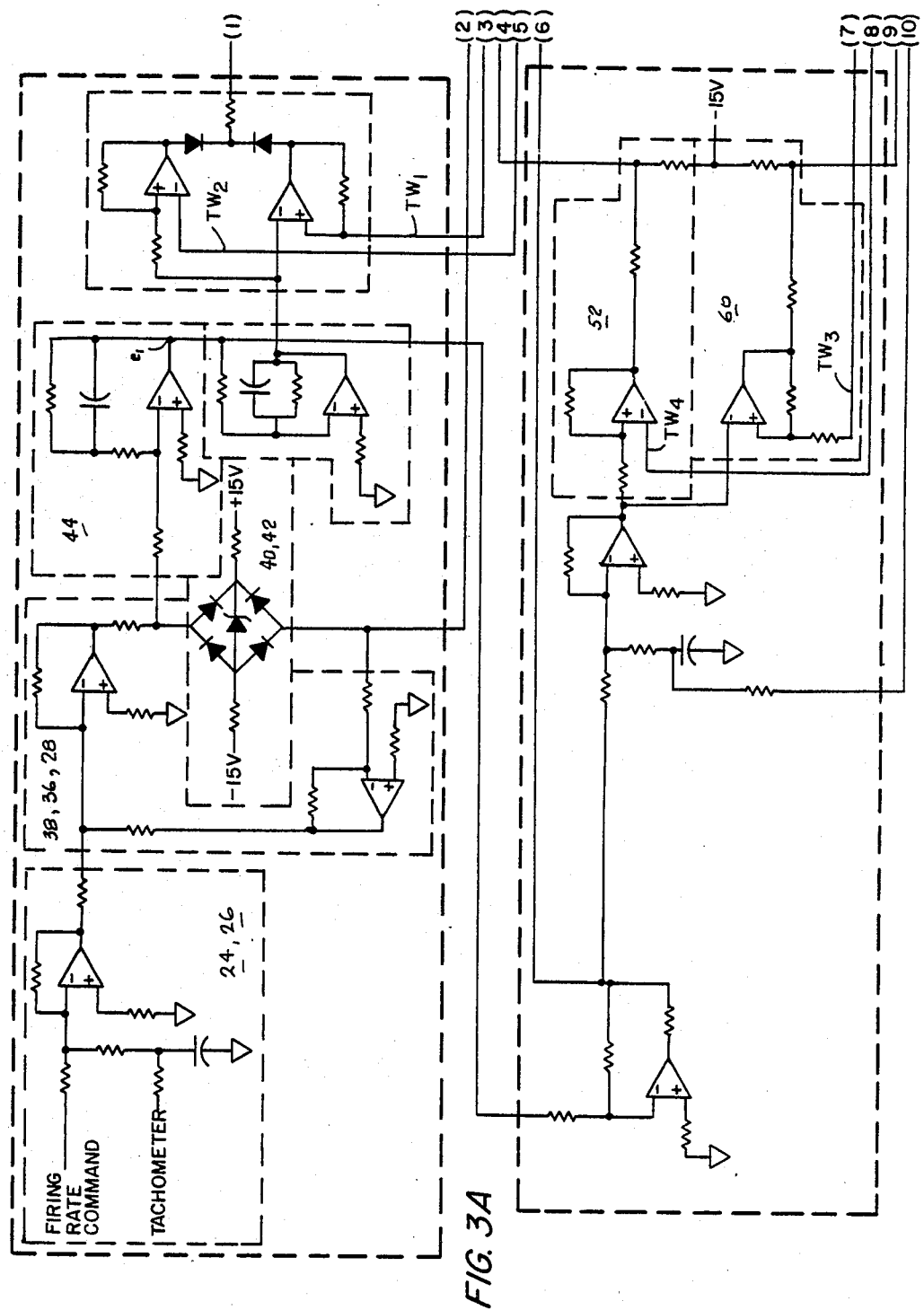

When the gun is firing at its steady state rate, exemplary conditions existing in the armature and field winding amplifiers are shown in FIG. 2.

When a cease fire signal is received, which is a removal of the firing rate command voltage from the input terminal of adder 24, the polarity of the voltage $e_1$ is reversed, and effective switches $Q_1$ and $Q_3$ are opened and effective switch $Q_2$ is closed. These switch actions remove battery voltage from the armature 74 and the forward field winding 34 and begin to establish current in the reverse field winding 32. The armature current limit circuit which includes the SGN($e_1$) circuit 30 and the zener diodes 40 and 42 serves to vary the reverse field current $i_{F2}$ and the resulting field flux and back emf, to maintain a constant armature current of 700 amperes. Since the resultant field flux has changed polarity, the positive armature current causes a negative armature torque is powerfully decelerate the gun. The SGN($e_1$) function in the armature current feedback loop maintains the stability of the armature current loop and the tachometer feedback loop after field reversal for powered gun deceleration, that is, dynamically braking the gun to a full stop.

In a gun system involving reverse clearing, by the provision of a rate command voltage to the adder 24 having a polarity which is opposite to that of the firing rate command voltage, full reversed armature torque can be applied until a desired reverse clearing speed, for example, 1000 s.p.m., is obtained. This speed is maintained until the desired number of empty cases in succession have been sensed to have been cycled through the gun, and then the gun can be dynamically braked to a stop.

The particular motor utilized is a totally enclosed, reversible, intermittent service, DC shunt field motor. The armature is rated at 108 volts with two separate field windings each capable of producing rated field flux with 20 volts applied.

Figures 4, 5:
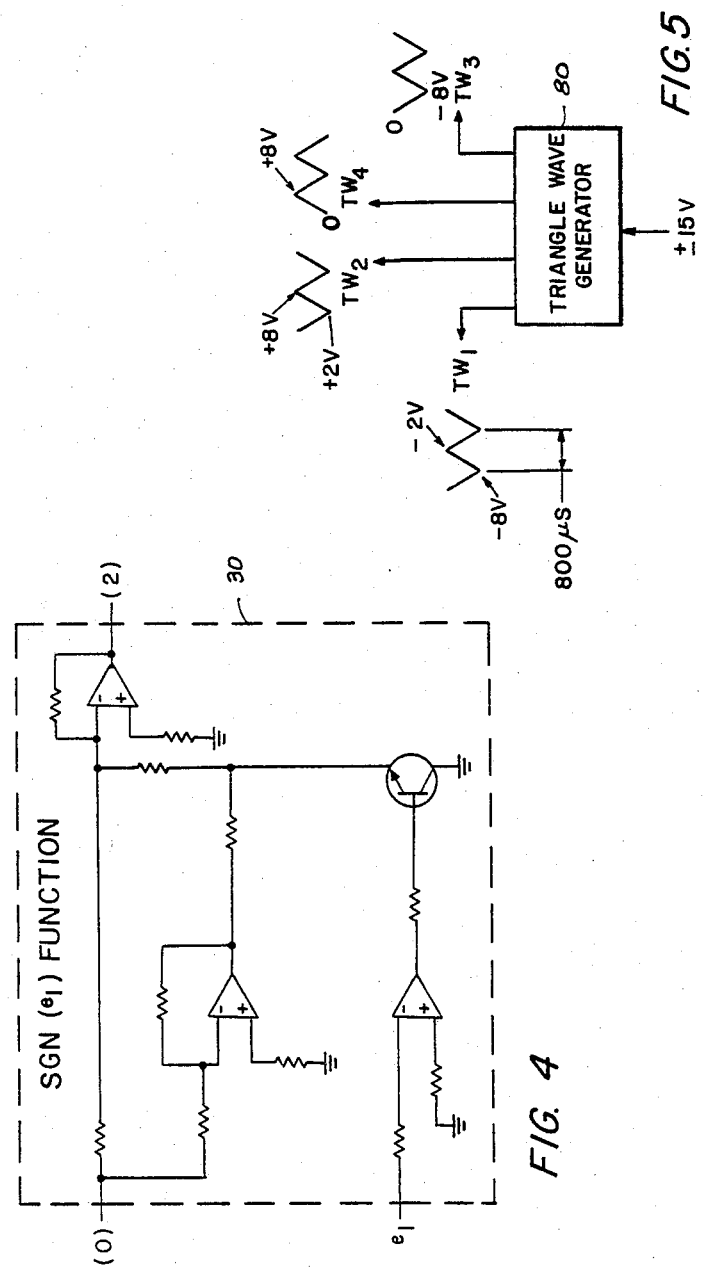
FIG. 4 is a circuit drawing of the SGN ($e_1$) function of the system of FIG. 1.
FIG. 5 is a block drawing of a triangle wave generator to be taken in conjunction with FIG. 1.

An exemplary circuit embodiment of the invention is shown in FIGS. 3A, 3B, 3C and FIG. 4 wherein the particular elements making up the boxes of FIGS. 1 and 5 are bounded by dashed lines with corresponding reference numbers. A triangle wave generator 80 provides two triangular wave signals $T_1$ and $T_2$ to the armature pulse width modulator 72, a triangular wave signal $T_3$ to the reverse field winding pulse width modulator 60, and a triangular wave signal $T_4$ to the forward field winding pulse width modulator 52.

In recapitulation, it will be seen that this invention includes an electric motor system having an armature winding and first means for providing field flux, and comprising:
second means for controlling current through said armature winding, and including:
third means (32,34,44,50,52,54,58,60,62) for controlling the polarity and the magnitude of said field flux, and
fourth means for supplying current to said armature winding;
the third means including:
fifth means (44) for providing a first signal ($e_1$) which is a control function for variable magnitude and polarity of field flux,
sixth means (58) for providing a second signal ($e_2$) which is a function of magnitude and plurality of field flux, and
seventh means (50,54 or 50,62) for minimizing the difference between said first and second signals;
the fourth means comprising:
eighth means having;
a first mode (70,72,22) of operation in which current from an external source is supplied to said armature winding, and
a second mode (80,50,60,62,32, 64,$R_{S2}$,52,54,34,56,$R_{S1}$,58) of operation in which said external source is disconnected and said armature is effectively short circuited, and
ninth means for controlling the magnitude of the current through said armature winding when said eighth means is in its first and second modes of operation [mode 1: 44,70,72, 22,74,$R_{S4}$,30,28,36,38,40,42; mode 2: 44,80,74, $R_{S4}$,30,28,36,38,40,42,50,60,62,32,64,$R_{S2}$,52,54, 34,56,$R_{S1}$,58]; and
tenth means for receiving a first signal which is a function of the actual rotational velocity of said armature, for receiving a second signal which is a function for the desired rotational velocity of said armature, and for providing a signal to said fifth means which is a function of the difference of said first and second signals.

What is claimed is:
1. An electric motor system comprising:
an armature winding;
means for providing field flux;
means for controlling current through said armature winding and including:
means for controlling the polarity and the magnitude of said field flux, and
means for supplying current to said armature winding;
said means for controlling the polarity and the magnitude of said field flux including:
means for providing a signal $e_1$ which is a control function for variable magnitude and polarity of field flux;
means for providing a signal $e_2$ which is a function of magnitude and polarity of field flux; and
means for minimizing the difference between signal $e_1$ and said signal $e_2$.
2. A system according to claim 1 wherein:
said means for supplying current to said armature winding includes:
means having:
(a) a first mode of operation in which current from an external source is supplied to said armature winding, and
(b) a second mode of operation in which said external source is disconnected and said armature is effectively short circuited.
3. A system according to claim 2 wherein:
said means for supplying current to said armature winding further includes:
means for controlling the magnitude of the current through said armature winding when said means having a first and a second mode of operation is in its first and second modes of operation.

4. An electric motor system comprising:
an armature winding;
means for providing field flux;
means for controlling current through said armature winding and including;
   means for controlling the polarity and the magnitude of said field flux, and
   means for supplying current to said armature winding;
said means for controlling the polarity and the magnitude of said field flux including:
   means for providing a signal $e_1$;
   means for receiving said signal $e_1$ and a second signal $e_2$ and for providing an output signal $e_3 = e_1 - e_2$;
forward field winding means including:
   a forward pulse width modulator receiving said signal $e_3$ and controlling a forward field power amplifier which is coupled to a forward field winding;
reverse field winding means including:
   a reverse pulse width modulator receiving said signal $e_3$ and controlling a reverse field power amplifier which is coupled by a reverse field winding; and
means for receiving a signal which is a function of current $i_{F1}$ through said forward field winding and for receiving a signal which is a function of current $i_{F2}$ through said reverse field winding and for providing a signal $K(i_{F1}-i_{F2})$ which is a function of the difference of said signals and is said signal $e_2$.

5. A system according to claim 4 wherein:
a first diode is coupled in shunt with said forward field winding;
a second diode is coupled in shunt with said reverse field winding;
said forward pulse width modulator drives said forward field power amplifier to provide current to said forward field winding when said signal $e_3$ is of one polarity, and any current induced in said reverse field winding flows through said second diode; and
said reverse pulse width modulator drives said reverse field power amplifier to provide current to said reverse field winding when said signal $e_3$ is of the other polarity, and any current induced in said reverse field winding flows through said first diode.

6. A system according to claim 1 further including:
means for receiving a signal $e_4$ which is a function of the actual rotational velocity of said armature, for receiving a signal $e_5$ which is a function for the desired rotational velocity of said armature, and for providing a signal to said means for providing signal $e_6$ which is a function of the difference of said signal $e_4$ and said signal $e_5$.

7. A system according to claim 1 further including:
means
   (a) for receiving;
      a signal $e_4$ which is a function of the actual rotational velocity of said armature,
      a signal $e_5$ which is a function for the desired rotational velocity of said armature,
      a signal $e_7$ whose polarity is that of said signal $e_1$,
      a signal $e_8$ which is a function of the current through said armature winding reaching a predetermined limit, and
   (b) for providing to said means for providing signal $e_1$, a signal $e_7$, which is a function of said signal $e_1$, and said signal $e_8$, and which shall not exceed a predetermined magnitude.

8. A system according to claim 5 further including:
means
   (a) for receiving
      a signal $e_4$ which is a function of the actual rotational velocity of said armature,
      a signal $e_5$ which is a function for the desired rotational velocity of said armature,
      a signal $e_7$ which is a function of the polarity of said signal $e_1$,
      a signal $e_8$ which is a function of the current through said armature winding reaching a predetermined limit, and
   (b) for providing, to said means for providing signal $e_1$, a signal $e_7$, which is a function of said signal $e_1$, andsaid signal $e_8$ and which shall not exceed a predetermined magnitude.

* * * * *

UNITED STATES PATENT AND TRADEMARK OFFICE
CERTIFICATE OF CORRECTION

PATENT NO. : 4,386,303
DATED : May 31, 1983
INVENTOR(S) : James A. Kleptz

It is certified that error appears in the above-identified patent and that said Letters Patent are hereby corrected as shown below:

Column 5, line 7, change "use" to --used--.

Column 5, line 28, change "is" to --to--.

Column 6, line 12, change "comprising" to --including--.

Column 8, line 44, change "andsaid" to --and said--.

Signed and Sealed this

Sixteenth Day of August 1983

[SEAL]

Attest:

GERALD J. MOSSINGHOFF

Attesting Officer

Commissioner of Patents and Trademarks